(12) United States Patent
Falco

(10) Patent No.: US 9,990,239 B2
(45) Date of Patent: Jun. 5, 2018

(54) SYSTEM AND METHOD FOR SUPPORTING COOPERATIVE NOTIFICATION OFFLOADING IN A DISTRIBUTED DATA GRID

(71) Applicant: Oracle International Corporation, Redwood Shores, CA (US)

(72) Inventor: Mark Falco, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 75 days.

(21) Appl. No.: 14/856,367

(22) Filed: Sep. 16, 2015

(65) Prior Publication Data

US 2016/0077888 A1    Mar. 17, 2016

Related U.S. Application Data

(60) Provisional application No. 62/051,013, filed on Sep. 16, 2014.

(51) Int. Cl.
*G06F 9/54*    (2006.01)

(52) U.S. Cl.
CPC .................... *G06F 9/542* (2013.01)

(58) Field of Classification Search
CPC ....................................................... G06F 9/542
See application file for complete search history.

(56) References Cited

U.S. PATENT DOCUMENTS

| 5,828,880 | A | 10/1998 | Hanko |
| 8,578,380 | B1 * | 11/2013 | Adams .................... G06F 9/526 |
| | | | 718/100 |
| 2002/0124241 | A1 | 9/2002 | Grey |
| 2003/0115168 | A1 | 6/2003 | Robison |
| 2004/0210899 | A1 | 10/2004 | Somogyi |
| 2010/0293135 | A1 | 11/2010 | Candea |
| 2011/0004883 | A1 | 1/2011 | El-Moursy |

OTHER PUBLICATIONS

Barrier Synchronisation in Java Carwyn Ball and Mark Bull Published: 2003.*

(Continued)

*Primary Examiner* — Emerson Puente
*Assistant Examiner* — Paul Mills
(74) *Attorney, Agent, or Firm* — Tucker Ellis LLP

(57) ABSTRACT

A system and method for cooperative notification offloading supports thread notification offloading in a multi-threaded messaging system such as a distributed data grid. Pending notifiers are maintained in a collection of pending notifiers. A signaling thread processes a first notifier in the collection of pending notifiers to wake a first thread. The first awoken thread processes additional notifiers in the collection of pending notifiers to wake additional threads. The additional awoken threads can process additional notifiers in a cycle until all pending notifiers in the collection are processed. Such cooperative notification offloading of notifier processing from the signaling thread improves performance of the signaling thread with respect to other tasks thereby improving performance of the signaling thread and the distributed data grid.

17 Claims, 7 Drawing Sheets

(56) References Cited

OTHER PUBLICATIONS

Coherence Clustering Principles Author identified as: "Dxfelcey-Oracle" Published Feb. 16, 2012.*
Oracle® Coherence Java API Reference—Class SingleWaiterMultiNotifier Release 3.7.1.0 Published Jun. 15, 2010.*
Class SingleWaiterCooperativeNotifier Oracle® Fusion Middleware Java API Reference for Oracle Coherence 12c (12.2.1.0.0) Published: No later than Dec. 20, 2017; Earliest date of availability unknown.*
United States Patent and Trademark Office, Office Action dated Oct. 13, 2016 for U.S. Appl. No. 14/856,370, 24 Pages.
Oracle® JROCKIT JVM Diagnostics Guide R27.6, Apr. 2009, Copyright © 2007, 2008.
Oracle® Fusion Middleware Tutorial for Oracle Coherence 12c(12.12) E26053-03, May 2014, Copyright © 2013, 2014.
Mellor-Crummey, John M., "Algorithms for Scalable Synchronization on Shared-Memory Multiprocessors", Jan. 1991; This paper appeared in ACM Trans. on Computer Systems, Feb. 1991.

* cited by examiner

SYSTEM AND METHOD FOR SUPPORTING COOPERATIVE NOTIFICATION OFFLOADING IN A DISTRIBUTED DATA GRID

CLAIM OF PRIORITY

This application claims priority to U.S. Provisional Patent Application No. 62/051,013, entitled "SYSTEM AND METHOD FOR SUPPORTING THREAD NOTIFICATION OFFLOADING IN A DISTRIBUTED DATA GRID" filed Sep. 16, 2014 which application is incorporated herein by reference.

RELATED CASE

This application is related to U.S. patent application Ser. No. 14/856,370, entitled "SYSTEM AND METHOD FOR SUPPORTING WAITING THREAD NOTIFICATION OFFLOADING IN A DISTRIBUTED DATA GRID" filed Sep. 16, 2015, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

SUMMARY

Described herein are systems and methods that can support thread notification offloading in a distributed data grid. In embodiments, thread notification offloading utilizes a set of waiting threads as an ad-hoc special purpose thread pool. A signaling/service thread in the distributed data grid offloads the processing of some or all of a collection of pending notifiers to threads which were waiting to be notified or are about to start waiting to be notified. Offloading is performed in a manner that distributes processing of notifiers over many threads thereby providing a system which scales to make use of multiple threads operating in parallel and avoids the performance capacity limits of a single thread. Offloading notifier processing from the signaling/service thread improves performance of the signaling/service thread with respect to other tasks thereby improving performance of the signaling/service thread and the distributed data grid.

In an embodiment, the system and method for thread notification offloading implements a cooperative notification offloading technique. Pending notifiers are maintained in a collection of pending notifiers. A signaling/service thread processes a first notifier in the collection of pending notifiers to wake a first thread. The first awoken thread then processes additional notifiers in the collection of pending notifiers to wake additional threads. The additional awoken threads can process additional notifiers in a cycle until all pending notifiers in the collection have been processed. Thus, the first awoken thread and the additional awoken threads cooperate with the signaling/service thread to process all pending notifiers. Offloading almost all of the notifier processing from the signaling/service thread to the first awoken thread and additional awoken threads improves performance of the signaling/service thread with respect to other tasks thereby improving performance of the signaling/service thread and the distributed data grid.

These and other objects and advantages of the present invention will become apparent to those skilled in the art from the following description of the various embodiments, when read in light of the accompanying drawings.

DETAILED DESCRIPTION

Figure 1:
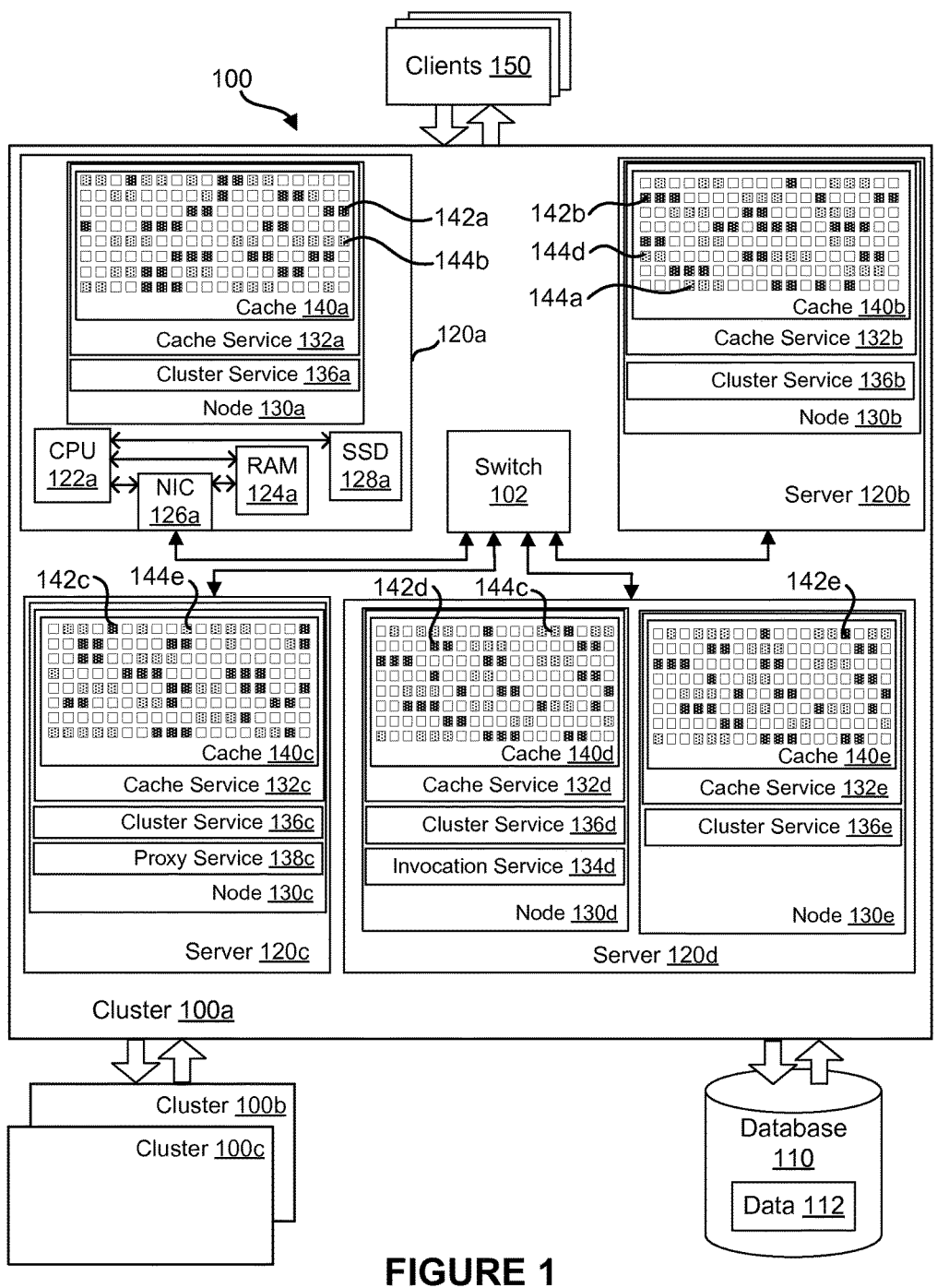
FIG. 1 illustrates a distributed data grid, in accordance with an embodiment of the invention.

Described herein are systems and methods that can support thread notification offloading in a distributed data grid such as described for example with respect to FIG. 1. In embodiments, thread notification offloading is performed utilizing a set of waiting threads as an ad-hoc special purpose thread pool. A signaling thread (for example a service thread in the distributed data grid described with respect to FIG. 1) offloads the processing of some or all notifiers to threads waiting to be notified or about to start waiting. Thread notification offloading is performed in a manner that distributes processing of notifiers over many threads thereby providing a system which scales to make use of multiple threads operating in parallel and avoids capacity limits of a single thread. Offloading notifier processing from the signaling/service thread improves performance of the signaling/service thread with respect to other tasks thereby improving performance of the signaling/service thread and the distributed data grid. The thread notification offloading system and method described herein with respect to FIGS. 2A, 2B, 3A, 3B, and 4 can be applied to a wide range of multithreaded messaging systems in addition to the distributed data grid described below.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

Thread Notification in a Distributed Data Grid

A distributed data grid, as described above, is configured to process very large numbers of short tasks received from clients. For example, the cache service thread of a distributed cache service provided by a node of the distributed data grid is configured to process very large numbers of storage operation requests such as put, get, etc. received from applications or other nodes in the distributed data grid. The processing of each storage operation is short-lived, however, the number of storage operations is very large. Each particular named service provided by a particular node in the distributed data grid is controlled by a single service thread. In order to efficiently process the very large number of short-lived operations, the service thread such as the cache service thread for the cache service can operate in conjunction with a large number of worker threads and/or client threads.

Thread notification refers to one thread bringing another thread out of a wait state. Threads are put into wait states while they await some action to complete. For example in the context of the distributed data grid described above, a thread operating on one node will issue a remote cache request to obtain a datum residing on another node. The thread will then go into a wait state awaiting the result of the request which is initially obtained via the dedicated cache service operating on the local node. The cache service thread on the nodes therefore receive a stream of cache results in response to requests. Each time the cache service thread receives a cache result from a remote cache, the service thread has to provide the result to the thread that sent the remote cache request. In order to provide the result to the thread that sent the remote cache request, the service thread must awaken the thread from the wait state. Thus, the service thread is required to perform notifying (or signaling) the object notifier associated with the waiting thread.

In Java, for example, a thread typically waits via an object notifier associated with the thread. The following code illustrates this model.

```
Object notifier = ...;
synchronized (notifier)
{
    notifier.wait( );
}
```

A waiting thread is awoken by another thread notifying (or signaling) the object notifier associated with the waiting thread. The following code illustrates this model.

```
Object notifier = ...;
synchronized (notifier)
{
    notifier.notify( );
}
```

The issue with such an approach is that the process of waking a thread by performing the signaling or processing associated with the waiting thread's notifier is relatively expensive. If there is a small number of threads (or just one thread) performing the signaling they can quickly become CPU bound spending most of their time doing nothing other than waking other threads. This bottleneck can become a significant performance limiter. For example, if the single cache service thread spends most of their time doing nothing other than waking other threads to receive the results or remote cache requests then its performance of other cache service functions will be degraded and performance of the distributed data grid will be impaired and/or limited.

As described in the description of a distributed data grid above, services provided by a node of a distributed data grid typically use one service thread to provide the specific functionality of the service. Each service thread operates in a node configured on a server which, as described above, preferably comprises a multi-core processor. A multi-core processor is capable of processing many threads in parallel and/or simultaneously. Some services optionally support a thread pool of worker threads that can be configured to provide the service thread with additional processing bandwidth. In prior systems, performance is reduced and/or limited by the capacity of the dedicated service thread to perform relatively expensive thread notification operations to wake threads from a wait state. It is therefore desirable to provide a different thread notification offloading system and method which overcomes the disadvantages of the conventional thread notification system and reduces the amount of work required to be performed by the service thread for thread notification thereby enabling the service thread to have improved performance with respect to other service thread operations and thereby improving the maximum performance of the distributed data grid.

The present disclosure therefore describes a new thread notification system which overcomes the disadvantages of the conventional thread notification system and reduces the amount of work required to be performed by the service thread for thread notification thereby enabling the service thread to have improved performance with respect to other service thread operations thereby improving the maximum performance of the distributed data grid.

Thread Notification Offloading

In accordance with an embodiment of the invention, the distributed data grid can provide a high performance notification offloading system and method which offloads the cost for thread notification from the notifier (e.g. the signaling/service thread) to the notifiee. That is signaling overhead associated with notification is offloaded to waiting threads that have just been awoken (cooperative notification offloading) or to threads which are just about to enter the wait state (waiting-thread notification offloading), or both. This new thread notification system overcomes the disadvantages of the conventional thread notification system and reduces the amount of signaling work required to be performed by the service thread for thread notification thereby enabling the service thread to have improved performance with respect to other service thread operations thereby improving the maximum performance of the distributed data grid. In an embodiment thread notification offloading is utilized to reduce the amount of signaling work required to be performed by the cache service thread of a node of the distributed data grid of FIG. 1 thereby enabling the cache service thread to have improved performance with respect to other cache service thread operations thereby improving the maximum performance of the distributed data grid.

Given the relatively expensive nature of the notification task and the very large number of notification tasks that are required to be performed, it is desirable to offload the processing of the notification tasks onto other threads rather than processing them on a service thread. Using a conventional thread pool for this purpose however can create additional work for the service thread. For example, when work is inserted into a thread pool a thread in the pool (a worker thread) must be awoken to process that work. Thus, the service thread has merely replaced the notification task with the task of waking a thread in the thread pool. This could introduce just as much work or more work to the system than just processing the notification task on the service thread, i.e. performance would be reduced. Offloading a notification task to a thread pool could be made less costly if each insertion of a notification task into the thread pool only wakes a worker thread if there is not already one which is awake and actively processing work requests. This would reduce the overhead of offloading the notifier processing task from the service thread to the thread pool however the work would be fully transferred onto that one worker thread in the thread pool which is awake and actively processing work requests. This one active worker thread would also be capacity limited, and the system would not scale to make use of multiple threads operating in parallel—which is the point of multithreaded environments such as the distributed data grid where the nodes typically operate on servers having multiple processors with multiple cores and capable of processing many threads in parallel.

The thread notification offloading system and method described herein achieves offloading of the notification task from the service thread without incurring the overhead associated with waking worker threads in a thread pool to perform the notification task and in a manner that distributes the notification task over many threads thereby providing a system which scales to make use of multiple threads operating in parallel and avoids capacity limits of a single thread. This is achieved by utilizing the set of waiting threads as an ad-hoc special purpose thread pool. Each time the signaling/service thread has a new thread to notify it inserts the thread's notifier into a collection of pending notifiers, building up a potentially large set of pending notifiers instead of actually processing the notifier on the service thread. The collection of pending notifiers is created as a global set shared across all waiting threads and signaling threads thereby allowing the use of threads other than the service thread to perform signaling of notifiers and waking of waiting threads.

In a cooperative notification offloading method, the service thread can then remove one pending notifier from the collection and performs the signaling to wake up one thread associated with the one pending notifier. In an embodiment, the service thread performs remove and notification only when the service thread has no other work to do, or periodically. In an embodiment, periodic performance of remove and notification by the service thread is carried out after every 256th insertion into the pool of pending notifiers (however this number can be larger or smaller depending on the needs of the system e.g. 64, 128, 512, 1024 etc). Each waiting thread is configured such that, upon being awoken from a wait state, the awoken thread attempts to wake some other number of threads by processing one or more pending notifier from the collection of pending notifiers before proceeding with their normal work. In a waiting-thread notification offloading method, threads which are about to enter a wait state process a number of pending notifiers prior to entering the wait state. Cooperative notification offloading and waiting-thread notification offloading can be used separately or in combination and are described in more detail below. Both systems and methods can operate using the collection of pending notifiers.

Cooperative Notification Offloading

Figure 2A:
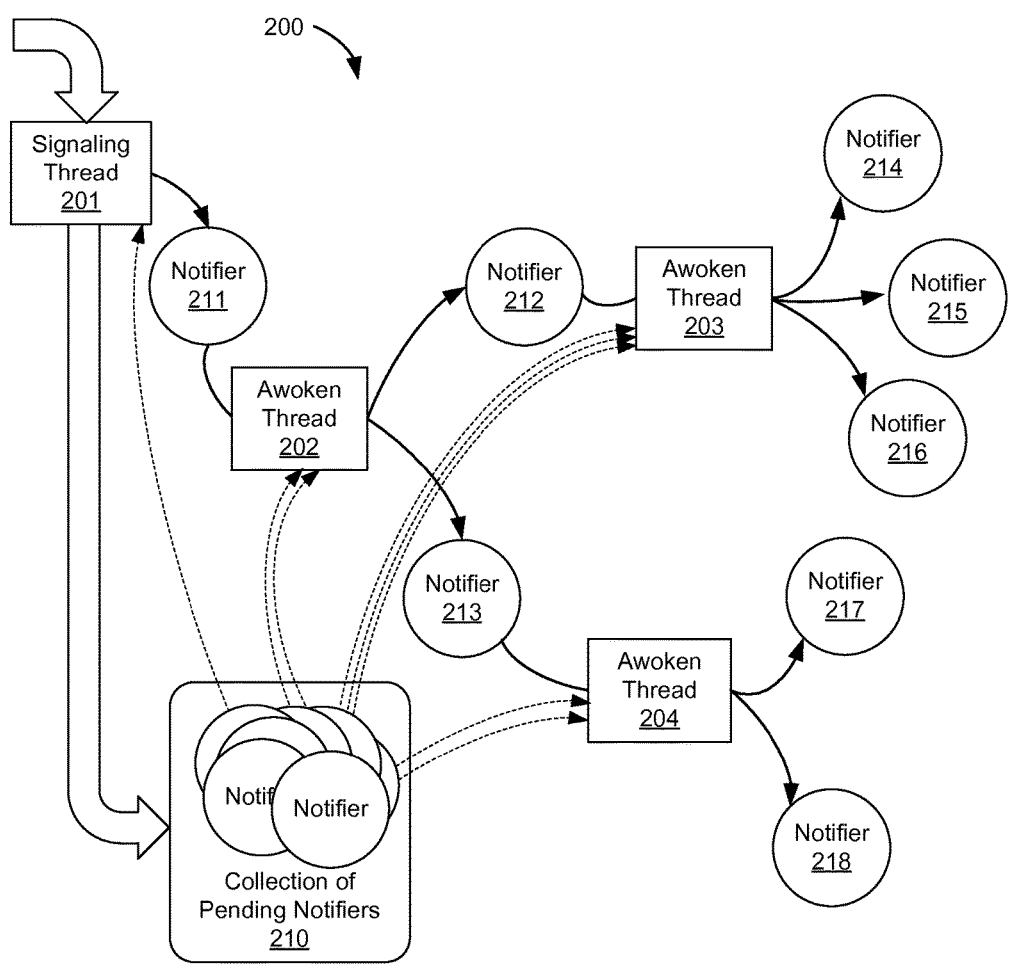
FIG. 2A shows an illustration of a cooperative notification offloading system, in accordance with an embodiment of the invention.

FIG. 2A shows an illustration of a thread notification offloading system 200 utilizing cooperative notification offloading and which can be implemented in a distributed data grid, in accordance with an embodiment of the invention. As shown in FIG. 2A, a signaling thread 201, operating can perform a thread notification operation. The signaling thread performs cooperative notification offloading by utilizing a notification tree for performing the thread notification operation, e.g. over a plurality of pending notifiers that are maintained in a collection 210. In an embodiment the signaling thread is a service thread of the distributed data grid of FIG. 1. In an embodiment the signaling thread is a cache service thread of the distributed data grid of FIG. 1.

As shown in FIG. 2A, the signaling thread 201 inserts the large volume of thread notifiers into a collection of pending notifiers 210, building up a potentially large set of pending notifiers instead of actually processing all the notifiers directly on the signaling thread. Subsequently, the signaling thread 201 can remove (dashed line) one notifier 211 from the collection 210 of pending notifiers. Thus, the signaling thread 201 can processes the notifier 211 (e.g. perform the signaling task), which notifies and wakes a thread associated with the notifier, e.g. the awoken thread 202. Then, the newly awoken thread 202 can remove (dashed lines) additional notifiers, e.g. notifiers 212-213, from the collection 210 of pending notifiers. The newly awoken thread 202 can then process the additional notifiers 212-213, each of which can notify another separate thread. For example, the notifier 212 can notify the awoken thread 203, and the notifier 213 can notify the awoken thread 204. Furthermore, each of the newly awoken thread 203 and the newly awoken thread 204 can remove (dashed lines) additional notifiers in the collection 210 of pending notifiers, if available, and process them to wake up additional threads accordingly. For example, the newly awoken thread 203 can process the additional notifiers 214-216, and the newly awoken thread 204 can process the additional notifiers 217-218.

In a preferred implementation, each newly awoken thread removes and processes two pending notifiers from the collection 210 of pending notifiers. Thus, each thread awoken from the wait state wakes two additional threads from the wait state. This creates a "notification tree" allowing for an even greater number of threads to be awoken from the wait state in parallel at each stage. An implementation in which each newly awoken thread processes two pending notifiers appears to be a good compromise in that it creates the "notification tree" optimization without dramatically increasing the observed wait time of each awoken thread. Using the notification tree, a large collection of pending notifiers can be processed quickly because the number of notifiers processed doubles at each stage (e.g. 2, 4, 8, 16, 32, 64, 128, 256—$2^n$ threads) until all pending notifiers are processed. In alternative embodiments each awoken thread processes more than two pending notifiers however this adds additional delay before the newly awoken threads can proceed with their own work for which they were awoken.

Thus, using the cooperative notification offloading approach, the system can ensure that all threads in the wait state and associated with the various pending notifiers in the collection 210, can be awoken from the wait state after the signaling thread 201 wakes up only one pending notifier in the collection of pending notifiers 210. The original signaling thread 201 has effectively ensured that all pending threads will be awoken by simply waking one thread from the collection 210 of pending notifiers. The signaling overhead is offloaded from the original signaling thread 201 to the newly awoken threads. This can save a significant amount of processing resource on the signaling thread allowing it to process other work (even just inserting more notifiers). Thus, for example, where the signaling thread is a service thread in a distributed data grid (such as the cache service thread of a node) use of cooperative notification offloading can improve overall performance of the service thread and the distributed data grid.

Figure 2B:
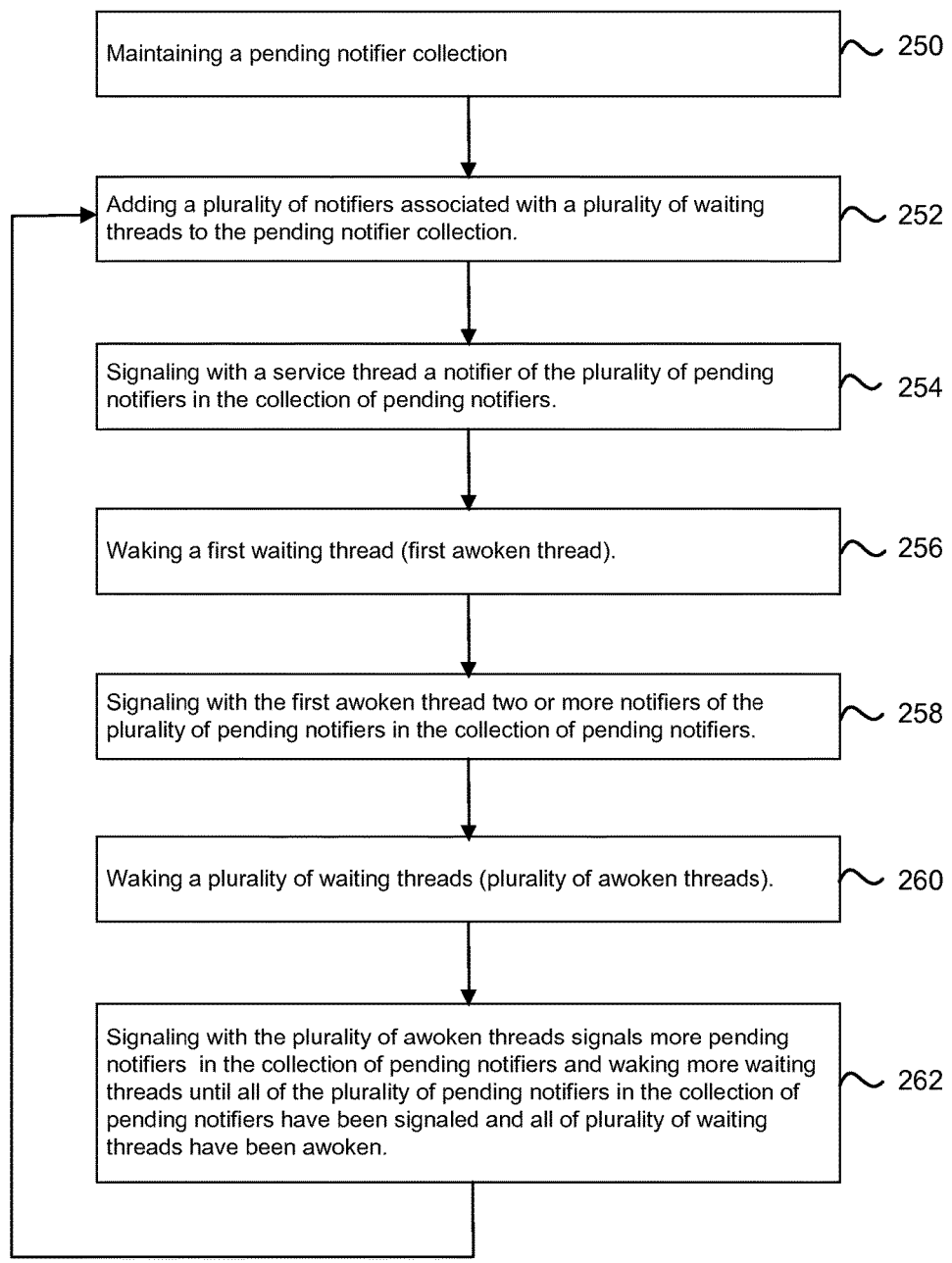
FIG. 2B shows an illustration of a cooperative notification offloading method, in accordance with an embodiment of the invention.

FIG. 2B shows an illustration of a cooperative notification offloading method, in accordance with an embodiment of the invention. The cooperative notification offloading method of FIG. 2B can be used for notification offloading in a multi-threaded messaging system having a service thread and a plurality of waiting threads. In an embodiment the method can be used in a distributed data grid where the service thread is, for example the cache service thread of a node and the waiting threads are client threads and/or worker threads. The cooperative notification offloading method of FIG. 2B may be used to reduce signaling overhead on the service thread thereby improving performance of the service thread for non-signaling tasks and thereby improving performance of a distributed data grid or other multi-threaded messaging system.

As shown in FIG. 2B, in an embodiment, the cooperative notification offloading method includes at step 250 maintaining a pending notifier collection. At step 252 a service thread adds a plurality of pending notifiers associated with said plurality of waiting threads to the pending notifier collection. The plurality of pending notifiers is added to sequentially over time by the service thread. At step 254, the service thread signals a notifier of the plurality of pending notifiers in the collection of pending notifiers. This is performed periodically (e.g. after 256 insertions) or when the service thread has no other work to perform. At step 256 a first waiting thread is awoken (first awoken thread) associated with the notifier signaled by the service thread. At step 258, the first awoken thread signals additional pending notifiers of the plurality of pending notifiers in the collection of pending notifiers. At step 260, the signaling wakes a plurality of additional awoken threads associated with said additional pending notifiers signaled by the first awoken thread. At step 262, each additional awoken thread signals more additional pending notifiers of the plurality of pending notifiers in the collection of pending notifiers and wakes more additional awoken threads associated with said more additional pending notifiers until all of the plurality of pending notifiers in the collection of pending notifiers have been signaled and all of plurality of waiting threads have been awoken. When there are no more pending notifiers, the method returns to step 252 where the service thread again adds a plurality of notifiers to the collection or pending notifiers. The service thread may begin adding notifiers to the collection even while awoken threads are still signaling pending notifiers.

In various embodiments, the cooperative notification offloading method of FIG. 2B may also include one or more of the following features. Each awoken thread can signal no more than two additional pending notifiers or no more than three additional pending notifiers. The pending notifier collection can be maintained as a global set shared across all notifier threads and signaling threads. The plurality of waiting threads can be configured so that they do not synchronize on the plurality of pending notifiers. The service thread can be configured such that it does not synchronize on the plurality of pending notifiers. And, signaling of the plurality of pending notifiers in said collection of pending notifiers can be performed using a lock-free method. The system and method for cooperative notification offloading can be performed as an alternative to waiting-thread notification offloading described below. The system and method for cooperative notification offloading can also be performed in addition to waiting-thread notification offloading.

Waiting-Thread Notification Offloading

Performance of the notification system can also be improved by using a newly waiting thread to process one or more of the notifiers in the collection of pending notifiers before (or instead of) entering the wait state. By definition any thread associated with a notifier in the collection of pending notifiers is ready to be awoken. A thread associated with a pending notifier can be awoken by any available thread, not just by other threads which have recently been awoken. Indeed, a thread that is just about to enter a wait state can be productively used to process pending notifiers from the collection of pending notifiers. Thus, a thread which is just about to enter the wait state can wake other threads before it enters the wait state itself. Additionally because this thread would otherwise be waiting until its own notifier is called, it is acceptable to have the thread wake as many threads as possible, rather than limiting it to just two.

Because the thread would otherwise be idle, using the thread to process notifiers does not degrade the performance of the thread's own work. While in the process of waking threads the thread can also check its own notification state, and if notified it can actually avoid ever entering the true wait state and going idle. This produces yet another benefit because the thread avoids the cost entering the wait state and then being awoken from the wait state. Moreover this benefit is achieved without wasting CPU cycles as would be done with a conventional busy-wait. This is because the thread is actually performing useful work processing notifiers to wake other threads rather than merely processing a keep-awake task.

In the Java™ programming language, for example, a thread can enter the waiting state in the following ways: invoking its sleep( ) method, invoking its yield( ) method, by blocking on I/O, by unsuccessfully attempting to acquire an object's lock, by invoking an object's wait( ) method, or by invoking its (deprecated) suspend( ) method. A thread could be configured to process notifiers immediately prior to any of these mechanisms for entering the wait state. However, in a distributed data grid, the most common scenario for using waiting-thread notification offloading will be where the thread blocks on I/O. Thus, for example in an embodiment a thread is configured such that when the thread blocks on I/O, the thread processes notifiers from the collection of pending notifiers, and keeps processing said notifiers until either there are no more notifiers (in which case the thread enters the wait state) or until the threads own notifier is called (i.e. a response to the I/O call is received).

For example, on making a remote cache call, the calling thread is blocked on I/O in that it cannot proceed until a response is received from the remote cache. At this point, the calling thread can processes notifiers from the collection of pending notifiers while waiting for the response from the remote cache. Indeed if it keeps processing notifiers until its own notifier is called, the calling thread may never have to enter the wait state thereby avoiding the overhead of entering and leaving the wait state. Thus, for example in an embodiment a thread making a remote cache call is configured such that after making the remote cache call, the thread processes notifiers from the collection of pending notifiers, and keeps processing said notifiers until either there are no more notifiers (in which case the thread enters the wait state) or until the threads own notifier is called (i.e. a response to the remote cache call is received).

Figure 3A:
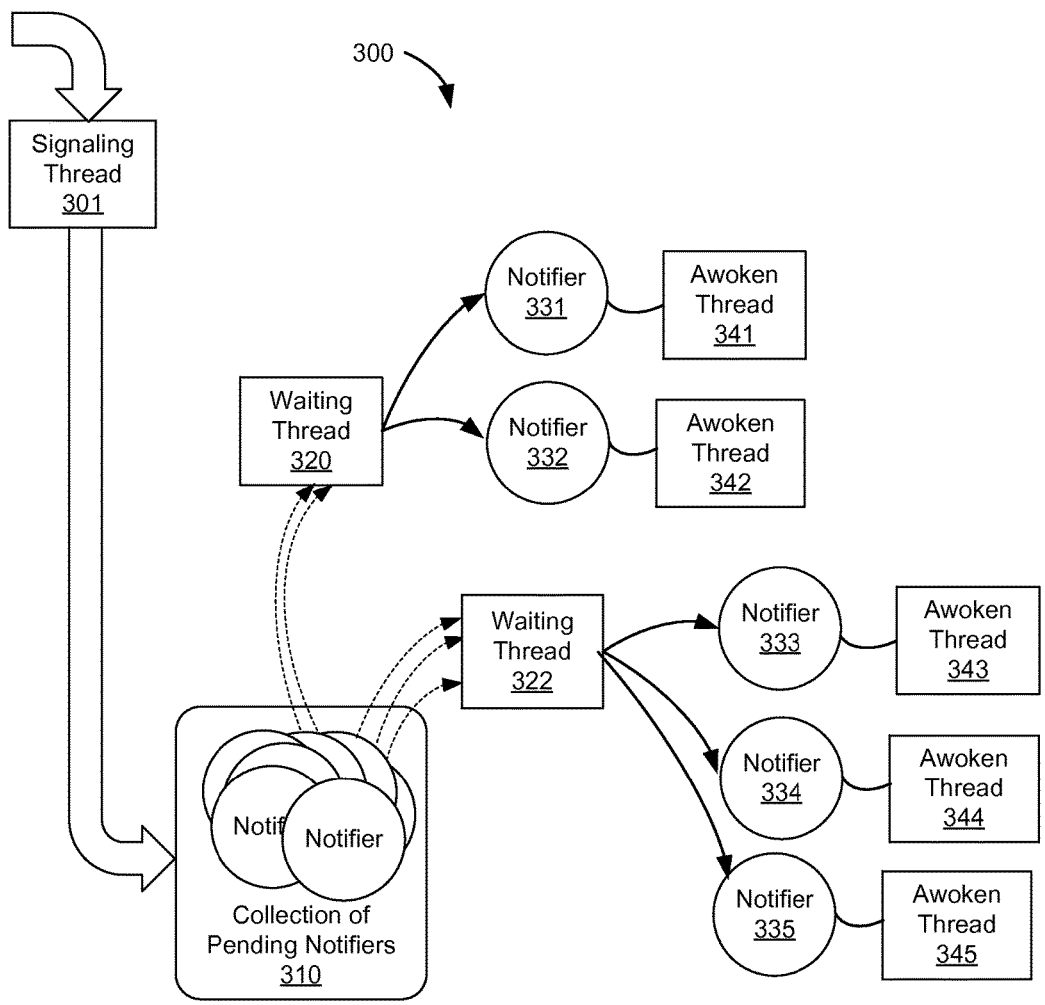
FIG. 3A shows an illustration of a waiting-thread notification offloading system, in accordance with an embodiment of the invention.

FIG. 3A illustrates a system of waiting-thread notification offloading 300 which utilizes threads which would otherwise enter the wait state to process pending notifiers to awake other threads from a wait state. As shown in FIG. 3A, the signaling thread 301 inserts the large volume of thread notifiers it receives into a collection of pending notifiers 310, building up a potentially large set of pending notifiers instead of actually processing all the notifiers directly on the signaling thread. Subsequently, waiting thread 320 which is just about to enter the wait state removes (dashed lines) a number of notifiers 331, 332 from the collection 310 of pending notifiers.

The waiting thread 320 processes the notifiers 331, 332 to wake up the associated threads—awoken thread 341 and awoken thread 342. Another waiting thread 322 which is just about to enter the wait state also removes (dashed lines) a number of notifiers 333, 334, 335 from the collection 310 of pending notifiers. The waiting thread 322 processes the notifiers 333, 334, 335 to wake up the associated threads—awoken thread 343, awoken thread 344, and awoken thread 345.

Additionally because the waiting threads 320, 322 would otherwise be idle until their own notifier is called, it is acceptable to have the waiting threads 320, 322 continue to remove notifiers from the collection of pending notifiers 310 and wake as many other threads as possible prior to their own notifier being called. Thus signaling overhead associated with the pending notifiers is offloaded from the signaling thread 301 to a plurality of "waiting threads" which are active threads which would otherwise enter the wait state.

Thus, using waiting threads which are about to enter the wait state to process pending notifiers from a collection of pending notifiers provides another way to offload the signaling overhead from the signaling thread/service thread. This can save a significant amount of processing resource on the signaling thread allowing it to process other work (even just inserting more notifiers). Thus, for example, where the signaling thread is a service thread in a distributed data grid (such as the cache service thread of a node) use of waiting-thread notification offloading can improve overall performance of the service thread and the distributed data grid.

Figure 3B:
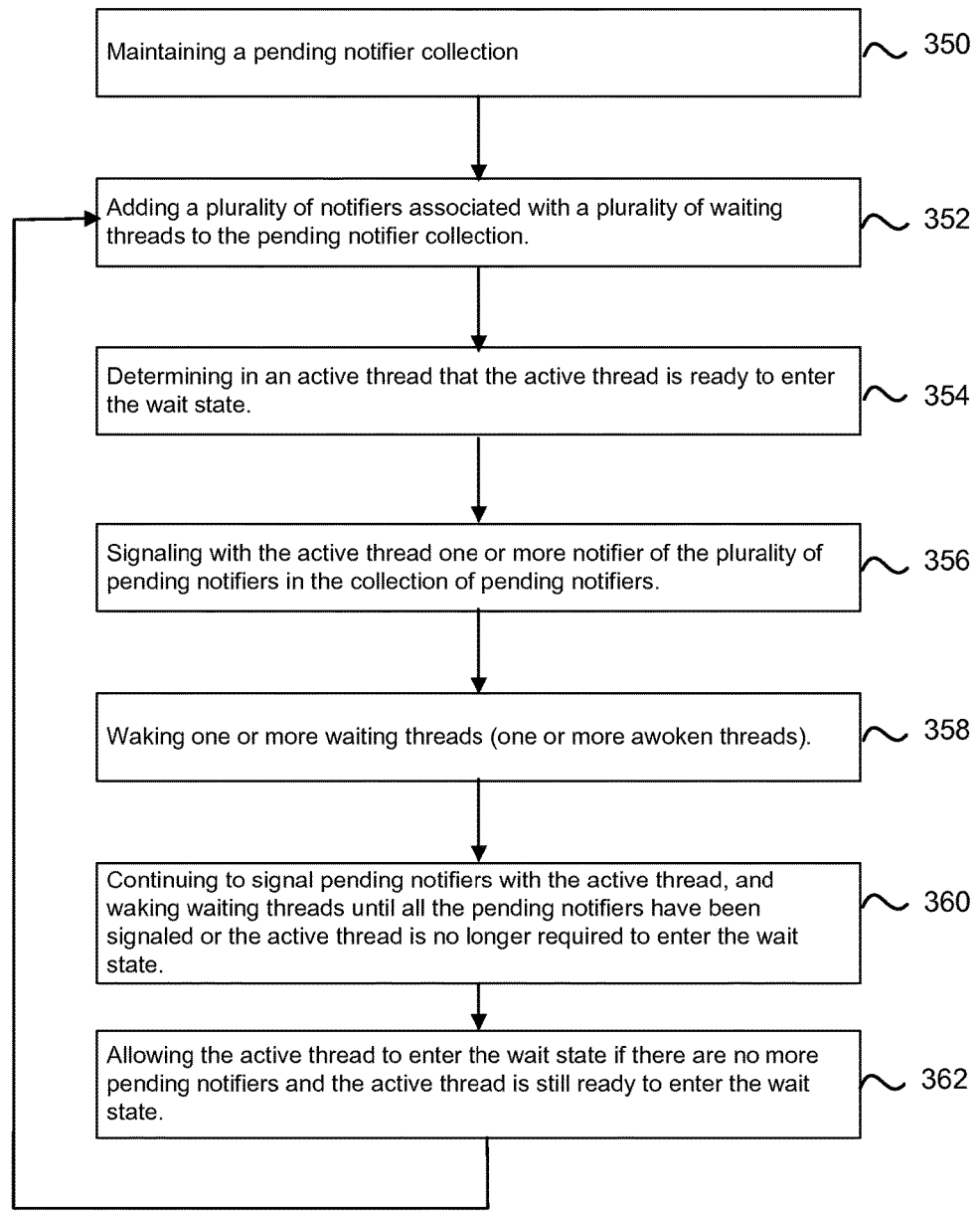
FIG. 3B shows an illustration of a waiting-thread notification offloading method, in accordance with an embodiment of the invention.

FIG. 3B shows an illustration of a waiting-thread notification offloading method, in accordance with an embodiment of the invention. The waiting-thread notification offloading method of FIG. 3B can be used for notification offloading in a multi-threaded messaging system having a service thread and a plurality of waiting threads. In an embodiment the method can be used in a distributed data grid where the service thread is, for example the cache service thread of a node and the waiting threads are client threads and/or worker threads. The waiting notification offloading method of FIG. 3B may be used to reduce signaling overhead on the service thread thereby improving performance of the service thread for non-signaling tasks and thereby improving performance of a distributed data grid or other multi-threaded messaging system.

As shown in FIG. 3B, in an embodiment, the waiting thread notification offloading method includes, at step 350, maintaining a pending notifier collection. At step 352, a service thread adds a plurality of pending notifiers associated with said plurality of waiting threads to the pending notifier collection. The plurality of pending notifiers is added to sequentially over time by the service thread. At step 354, an active thread determines it is ready to enter the wait state because for example it has made a remote cache call and is waiting for a response (blocked on I/O). At step 365, instead of entering the wait state, the active thread signals one or more notifier of the plurality of pending notifiers in the collection of pending notifiers. At step 358 one or more waiting thread is awoken (awoken thread) associated with the notifier signaled by the active thread.

At step 360, the active thread continues to signal additional pending notifiers of the plurality of pending notifiers in the collection of pending notifiers until there are no more pending notifiers, or the active thread is no longer ready to enter the wait state (for example because a response has been received to the remote cache call). At step 362, the active thread is allowed to enter the wait state, if there are no more pending notifiers, and the active thread is still ready to wait (for example because a response has not yet been received to the remote cache call). The method is repeated from step 352 where the service thread again adds a plurality of notifiers to the collection or pending notifiers. The service thread may begin adding notifiers to the collection even while the active thread (or threads) are still signaling pending notifiers.

In various embodiments, the waiting thread notification offloading method of FIG. 3B may also include one or more of the following features. The pending notifier collection can be maintained as a global set shared across all notifier threads and signaling threads. The plurality of waiting threads can be configured so that they do not synchronize on the plurality of pending notifiers. The service thread can be configured such that it does not synchronize on the plurality of pending notifiers. Each thread awoken by the active thread can be configured to signal two additional pending notifiers of the plurality of pending notifiers in the pending notifier collection and wake two additional awoken threads associated with said additional pending notifiers. And, signaling of the plurality of pending notifiers in said collection of pending notifiers can be performed using a lock-free method. The system and method for waiting-thread notification offloading can be performed as an alternative to cooperative notification offloading. The system and method for waiting-thread notification offloading can also be performed in addition to cooperative notification offloading as illustrated in FIG. 4.

Figure 4:
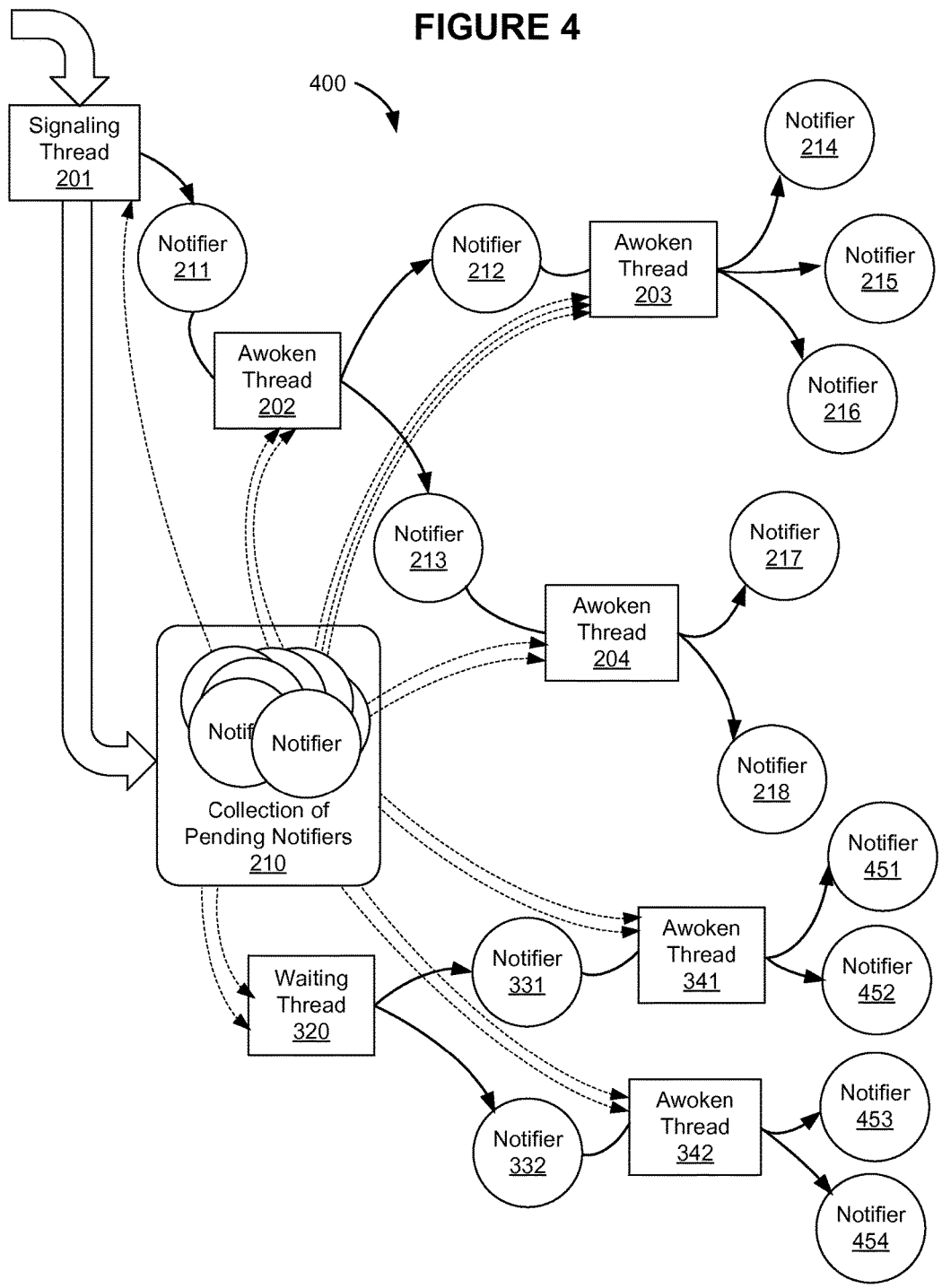
FIG. 4 shows an illustration of cooperative and waiting-thread notification offloading, in accordance with an embodiment of the invention.

FIG. 4 illustrates a system 400 utilizing threads about to enter the wait state to process pending notifiers to awake other threads from a wake state as illustrated in FIGS. 3A and 3B in addition to the cooperative notification offloading system and method of FIGS. 2A and 2B. As shown in FIG. 4, the system and method of FIGS. 2A and 2B is modified by additionally having waiting thread 320 which is just about to enter the wait state remove (dashed lines) a number of notifiers 331, 332 from the collection 210 of pending notifiers. The waiting thread 320 processes the notifiers 331, 332 to wake up the associated threads—awoken thread 341 and awoken thread 342. Note that in this case awoken thread 341 and awoken thread 342 also remove (dashed lines) two notifiers each (notifiers 451, 452, 453, and 454) from the collection 210 of pending notifiers. Awoken thread 341 and 342 then process these notifiers 451, 452, 453, 454 to wake up four additional threads (not shown) before performing their own work in accordance with the cooperative notification offloading system and method. Thus, the system 400 of FIG. 4 implements cooperative notification offloading as well as waiting-thread notification offloading to signal notifiers in the collection or pending notifiers 210.

Implementation Details

A notifier class is a condition-like object used to block thread for a notification. No external locking or synchronization is needed for notifiers. Clients do not need to synchronize on the notifier class prior to calling. A notifier is created for a thread and then the thread enters the wait state (await). The notifier notifies the waiting thread when signaled, waking it up if awaiting, or preventing the thread from going to sleep on the next await attempt.

The waiting-thread notification offloading system and method may be implemented, for example, in the Java™ programming language as a SingleWaiterMultiNotifier which attempts to offload potentially expensive "notification" work from signaling threads onto other threads. The SingleWaiterMultiNotifier class implements a notifier and represents a condition-like object, used by a single thread to block for a notification, and optimized for many concurrent notifications by other threads. This, creates a collection of pending notifiers as a global set shared across all notifier threads and signaling threads. No synchronization is needed to use the class; i.e. clients do not synchronize on this class prior to calling await. This has the advantages of simplifying the programming model because signalers don't need to track their pending notifiers and also allows different signalers to cooperate in the awaking process by selecting and processing notifiers. Thus multiple possible threads are enable to signal a notifier to wake a waiting thread. Using the global set of pending notifiers of the SingleWaiterMultiNotifier class, threads which are ready to enter the wait state can signal pending notifiers for threads in the await state thereby waking the threads.

The cooperative notification offloading system and method may be implemented, for example, in the Java™ programming language as a SingleWaiterCooperativeNotifier class which encapsulates the cooperative notification offloading pattern. The SingleWaiterCooperativeNotifier class leverages the SingleWaiterMultiNotifier class in that it utilizes the same collection of pending notifiers as a global set shared across all notifier threads and signaling threads. The cooperative notification offloading system and method is beneficial when there are few signaling threads, but potentially many waiting threads, each waiting on their own notifier. In this case however, the service thread must occasionally wake a first waiting thread. The first newly awoken thread (and subsequently awoken threads) signal additional notifiers and wake additional threads. This forms a notification tree which quickly signals all pending notifiers in the collection. The Usage of the SingleWaiterCooperativeNotifier class implementing the cooperative notification offloading pattern is thus different is some aspects than the usage of the typical monitor-based pattern. The waiting thread waits as follows:

---
Notifier notifier = ...
notifier.await( );
---

The signaling threads signals as follows:

---
Notifier notifier = ...
Notifier.signal( );
...
SingleWaiterMultiNotifier.flush( );
---

The SingleWaiterCooperativeNotifier class may be implemented without either of the waiting nor signaling threads being required to synchronize on the notifier. Internally the SingleWaiterCooperativeNotifier can use a combination of the Java™ programming language AtomicReference.compareAndSet operation and LockSupport.park/unpark to provide notification in a lock free manor. This requires that only one thread can wait on a given notifier at any one time. However, the ability to perform notification is a lock-free manner is an additional benefit to the cooperative notification offloading approach. However, such lock-free notification is not required to achieve the benefit from the notification offloading.

The other major usage difference for the SingleWaiterCooperativeNotifier class compared to a conventional notifier is the call to flush( ) by the signaling thread. This is important in that it is the call which wakes the first waiting thread (e.g. awoken thread 202 of FIG. 2A). Thus in this implementation, the call to flush( ) by the signaling thread is required to ensure that a first thread in the collection of pending notifiers will be awoken to wake other threads and allow the "notification tree" to form and wake all the other threads with pending notifiers. The flush( ) operation removes a single pending notifier from the collection of pending notifiers and wakes the associated thread. In an embodiment flush can be called after every 256 insertions into the collection of pending notifiers, or when the signaling thread has no other work to perform.

The typical usage pattern for a notifier that is processed by the signaling thread without offloading is that a signaling threads only needs to call flush( ) when it has run out of work to do and is itself about to enter its own wait state. Thus, if the signaling thread never runs out of work to do, no flush( ) calls are required as the signal( ) operation will periodically wake notifier a thread rather than storing it in the pending set. Accordingly, in order to ensure that a notification tree is formed, an explicit flush( ) call has to be made by the signaling thread periodically (e.g. every 256 insertions), or whenever the collection of pending notifies reaches a triggering threshold. In an embodiment, the explicit flush( ) call is made by the signaling thread after every 256 insertions. Alternatively, the triggering threshold can be expiration of a timer or when the collection of pending notifiers reaches a predefined size.

The flush( ) call is a static method of the SingleWaiterMultiNotifier class, and thus is not associated to any specific notifier or signaling thread. What this implies is that internally the set of pending threads is a global set shared across all notifiers and signalers within the process. This has two advantages. First, it simplifies the programming model because signalers don't need to track their pending notifiers. Secondly it allows the different signalers and more importantly multiple awoken threads within the process to cooperate in the awaking process by selecting and processing notifiers. An additional benefit is that the signaling thread can itself use the SingleWaiterCooperativeNotifier for its own wait state. This is because, as described earlier, prior to waiting a thread will attempt to wake any threads in the pending set, thus an await call by the signaling thread is an implied global flush( ).

In an embodiment thread notification offloading as provided by the implementation of the SingleWaiterMultiNotifier class described above is utilized to reduce the amount of signaling work required to be performed by a service thread (such as the cache service thread) of a node of the distributed data grid of FIG. 1 thereby enabling the service thread to have improved performance with respect to other service thread operations thereby improving the maximum performance of the distributed data grid. However, the thread notification offloading systems and methods described herein are also useful and applicable to many other multithreaded messaging systems.

Figure 5:
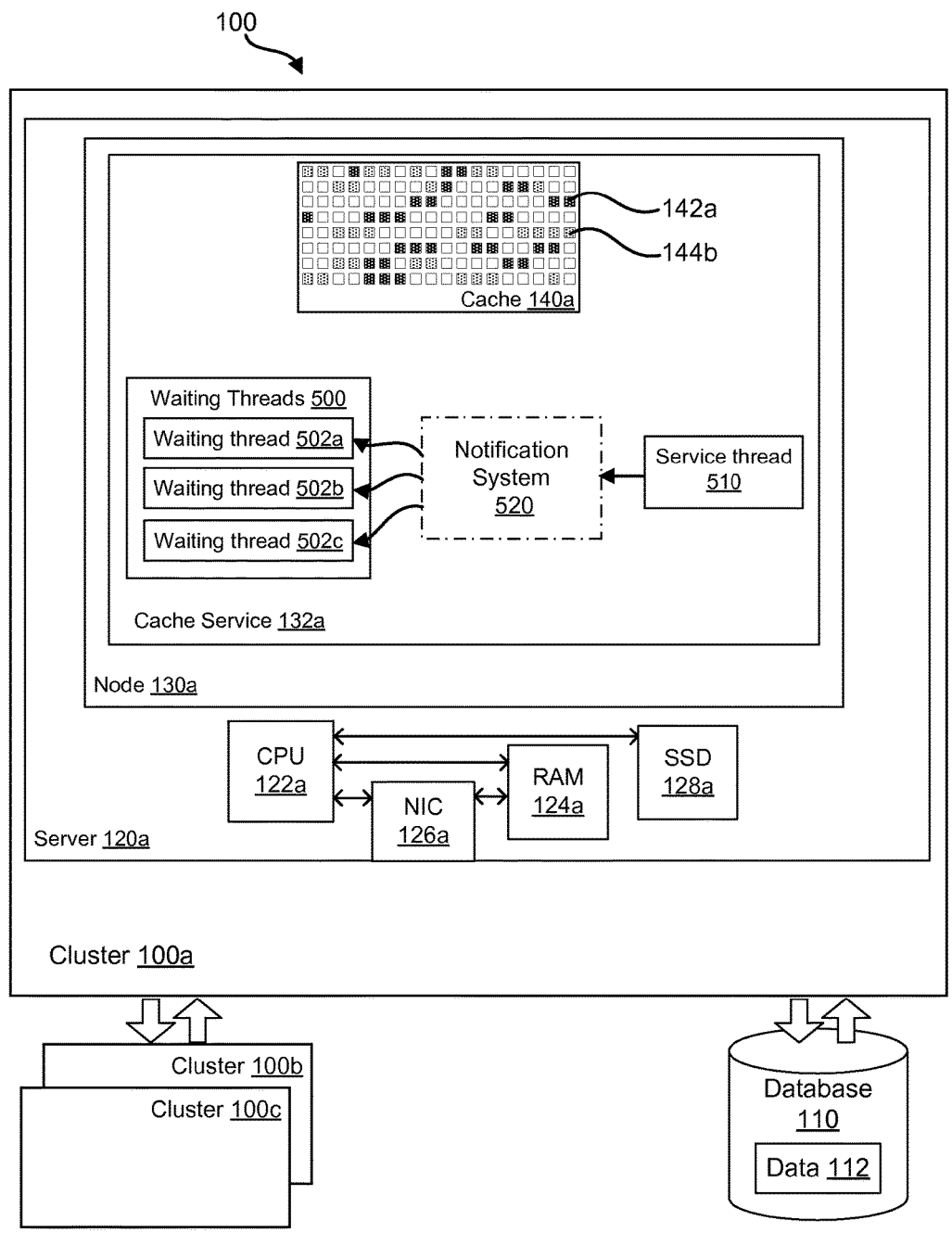
FIG. 5 illustrates implementation of a thread notification system in a distributed data grid, in accordance with an embodiment of the invention.

FIG. 5 illustrates implementation of a notification offloading system 520 in a distributed data grid 100, in accordance with an embodiment of the invention. As shown, for example, in FIG. 5, a service provided by a node 130a in a distributed data grid 100 can be provided by a service thread 510. The service may be, for example a cache service 132a. The service thread may be associated with a plurality 500 of waiting threads (three shown) 502a, 502b, 502c. The waiting threads may be in a wait state because for example they are waiting for a response to a remote cache call. A notification offloading system 520, as described above, can be used to offload the signaling overhead associated with signaling pending notifiers from the service thread 510. The notification offloading system 520 may implement cooperative notification offloading as illustrated in FIGS. 2A and 3B, waiting-thread notification offloading as illustrated in FIGS. 3A and 3B, or both as illustrated in FIG. 4. Offloading some or all of the signaling overhead form the service thread 510 leaves the service thread 510 more time to perform other service thread tasks. Implementation of notification offloading system 520 in the node 130a thus improves performance of the service thread 510, and the distributed data grid 100 as a whole. The notification offloading systems and methods can also be applied to a wide variety of other applications requiring notification of many waiting threads in the distributed data grid 100 or other computing environments. For example, the notification offloading systems and methods can also be implemented in other multi-threaded messaging systems.

While various embodiments of the present invention have been described above, it should be understood that they have been presented by way of example, and not limitation. It will be apparent to persons skilled in the relevant art that various changes in form and detail can be made therein without departing from the spirit and scope of the invention.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting cooperative notification offloading in a multithreaded messaging system having a service thread and a plurality of waiting threads awaiting respective responses to respectively issued requests, wherein each waiting thread has a corresponding notifier, the method comprising:
   receiving, by the service thread, a plurality of the responses and, for each received response, inserting the notifier corresponding to the waiting thread awaiting the received response into a pending notifier collection;
   signaling, with said service thread, a first pending notifier of the plurality of pending notifiers in the collection of pending notifiers, wherein signaling the first pending notifier wakes the corresponding thread associated with said first pending notifier;
   signaling, with the awoken corresponding thread associated with the first pending notifier, additional pending notifiers of the plurality of pending notifiers in the collection of pending notifiers, wherein signaling the additional pending notifiers wakes the corresponding thread of the plurality of waiting threads that each additional pending notifier is associated with; and
   signaling, by each additional awoken corresponding thread of the plurality of waiting threads that each additional pending notifier is associated with, more additional pending notifiers of the plurality of pending notifiers in the collection of pending notifiers, wherein signaling the more additional pending notifiers wakes more additional corresponding threads associated with said more additional pending notifiers until all of the plurality of pending notifiers in the collection of pending notifiers have been signaled and all of plurality of waiting threads have been awoken.

2. The method of claim 1, wherein each awoken thread signals no more than two additional pending notifiers.

3. The method of claim 1, wherein each awoken thread signals no more than three additional pending notifiers.

4. The method of claim 1, wherein the pending notifier collection is a global set shared across all notifier threads and signaling threads.

5. The method of claim 1, wherein the plurality of waiting threads do not synchronize on the plurality of pending notifiers.

6. The method of claim 5, wherein the service thread does not synchronize on the plurality of pending notifiers.

7. The method of claim 1, wherein the service thread is a cache service thread in a distributed data grid.

8. The method of claim 1, wherein signaling said plurality of pending notifiers in said collection of pending notifiers is performed using a lock-free method.

9. A system for supporting cooperative notification offloading, the system comprising:
   a computer system having a memory and a processor, wherein the processor has a plurality of cores and is capable of multi-threaded operation;
   a multi-threaded messaging system operating on said computer system and having a service thread and a plurality of waiting threads awaiting respective responses to respectively issued requests, wherein each waiting thread has a corresponding notifier;
   a pending notifier collection stored in said memory, wherein the service thread is configured to receive a plurality of the responses and, for each received response, insert the notifier corresponding to the waiting thread awaiting the received response into the pending notifier collection;
   wherein said signaling thread is configured to signal a first pending notifier of the plurality of pending notifiers in the pending notifier collection, and wherein signaling the first pending notifier wakes the corresponding thread associated with said first pending notifier;

wherein the awoken corresponding thread associated with the first pending notifier is configured to signal additional pending notifiers of the plurality of pending notifiers in the pending notifier collection, and wherein signaling the additional pending notifiers wakes the corresponding thread of the plurality of waiting threads that each additional pending notifier is associated with; and wherein each additional awoken corresponding thread of the plurality of waiting threads that each additional pending notifier is associated with is configured to signal more additional pending notifiers of the plurality of pending notifiers in the collection of pending notifiers, and wherein signaling the more additional pending notifiers wakes more additional corresponding threads associated with said more additional pending notifiers until all of the plurality of pending notifiers in the collection of pending notifiers have been signaled and all of plurality of waiting threads have been awoken.

10. The system of claim 9, wherein each awoken thread is configured to signal no more than two additional pending notifiers.

11. The system of claim 9, wherein each awoken thread is configured to signal no more than three additional pending notifiers.

12. The system of claim 9, wherein the pending notifier collection is maintained as a global set shared across all notifier threads and signaling threads.

13. The system of claim 9, wherein the service thread does not synchronize on the plurality of pending notifiers.

14. The system of claim 13, wherein the plurality of waiting threads do not synchronize on the plurality of pending notifiers.

15. The system of claim 9, wherein the system is a distributed data grid and the service thread is a cache service thread on a node in the distributed data grid.

16. The system of claim 9, wherein the service thread and said awoken threads are configured to signal said plurality of pending notifiers in said collection of pending notifiers using a lock-free method.

17. A non-transitory computer-readable media comprising instructions stored thereon for supporting cooperative notification offloading in a multi-threaded messaging system having a service thread and a plurality of waiting threads awaiting respective responses to respectively issued requests, wherein each waiting thread has a corresponding notifier, which instructions, when executed, cause a computer system to perform steps comprising:

receiving, by the service thread, a plurality of the responses and, for each received response, inserting the notifier corresponding to the waiting thread awaiting the received response into a pending notifier collection;

signaling, with said service thread, a first pending notifier of the plurality of pending notifiers in the collection of pending notifiers, wherein signaling the first pending notifier wakes the corresponding thread associated with said first pending notifier;

signaling, with the awoken corresponding thread associated with the first pending notifier, additional pending notifiers of the plurality of pending notifiers in the collection of pending notifiers, wherein signaling the additional pending notifiers wakes the corresponding thread of the plurality of waiting threads that each additional pending notifier is associated with; and signaling, by each additional awoken corresponding thread of the plurality of waiting threads that each additional pending notifier is associated with, more additional pending notifiers of the plurality of pending notifiers in the collection of pending notifiers, wherein signaling the more additional pending notifiers wakes more additional corresponding threads associated with said more additional pending notifiers until all of the plurality of pending notifiers in the collection of pending notifiers have been signaled and all of plurality of waiting threads have been awoken.

* * * * *